INVENTORS
Charles M. Allred
Paul A. Hudson
BY John C. Stall
ATTORNEY

Aug. 8, 1961  P. A. HUDSON ET AL  2,995,708
DRY STATIC CALORIMETER FOR RF POWER MEASUREMENT
Filed Nov. 9, 1959  2 Sheets-Sheet 2

INVENTORS
Charles M. Allred
Paul A. Hudson
BY John C. Stahl
ATTORNEY

United States Patent Office 2,995,708
Patented Aug. 8, 1961

2,995,708
DRY STATIC CALORIMETER FOR RF
POWER MEASUREMENT
Paul A. Hudson and Charles M. Allred, Boulder, Colo.,
assignors to the United States of America as represented by the Secretary of Commerce
Filed Nov. 9, 1959, Ser. No. 851,925
3 Claims. (Cl. 324—106)

This invention relates to wattmeters and more particularly to an improved wattmeter of the static calorimetric type for measuring power primarily in the radio frequency range.

The measurement of RF power in standards work at frequencies below about 500 mc. with accuracies of ±1% or better has been chiefly limited in the past to the dynamic range which can be measured with bolometer or thermistor bridges. At the present time such bridges have an upper limit of approximately 100 milliwatts.

As is well known in the art, it is the aim of all calorimetric methods to dissipate completely the incoming electromagnetic energy in some medium, using the effect on the medium as a measure of the incoming power.

In direct-heating static calorimeters the calorimetric medium is itself used to dissipate the electromagnetic energy. A prior-art, dry-load calorimeter for use in the microwave region consists of a coaxial line filled with a high-loss dielectric; power is measured by the rate of temperature rise in the dielectric. This type of calorimeter can also be extended to the lower frequency ranges by the use of materials that have sufficiently high loss in the desired frequency band and which are capable of withstanding the temperature rise.

In the indirect-heating static calorimeters a resistive load is immersed in a calorimetric fluid such as oil, water, or air. At low frequencies load reactance can usually be made as low as desired and no problem is presented if a resistive termination is employed. At radio frequencies, however, nonreactive loads are more difficult to obtain and matching systems are frequently required to adjust the load to the desired impedance.

The wattmeter of this invention is a transfer standard between accurately known values of D.C. power and the RF power to be measured. Specifically, it is a highly accurate, simply instrumented, indirectly-heated static calorimeter having a dynamic range which extends from 20 milliwatts to 12 watts and having a frequency range from D.C. to 300 mc. Analysis of errors indicates a maximum uncertainty of ±(0.5%+0.2 mw.) in the measured RF power.

Because intercomparison of independent methods of measurement is highly desirable in standards work, the range of the improved wattmeter of this invention permits its comparison with both the thermistor bridge and a liquid flow-type power meter. In comparison measurements with other independent methods, agreements of ±0.5% or better were obtained. This accuracy represents an improvement of one order of magnitude over the best presently available commercial instruments designed for the above power and frequency range.

It is an object of this invention to provide an improved device for the static calorimetric measurement of power.

Another object of this invention is to provide an improved static-calorimetric wattmeter which will measure power over a broad band of frequencies with high efficiency.

A further object of this invention is to provide a calorimetric wattmeter which is capable of accurately measuring power at all frequencies from direct current through the radio frequency range and which may be conveniently calibrated with direct current.

Other uses and advantages of the invention will become apparent upon reference to the specification and drawings in which.

Figures 1, 2:
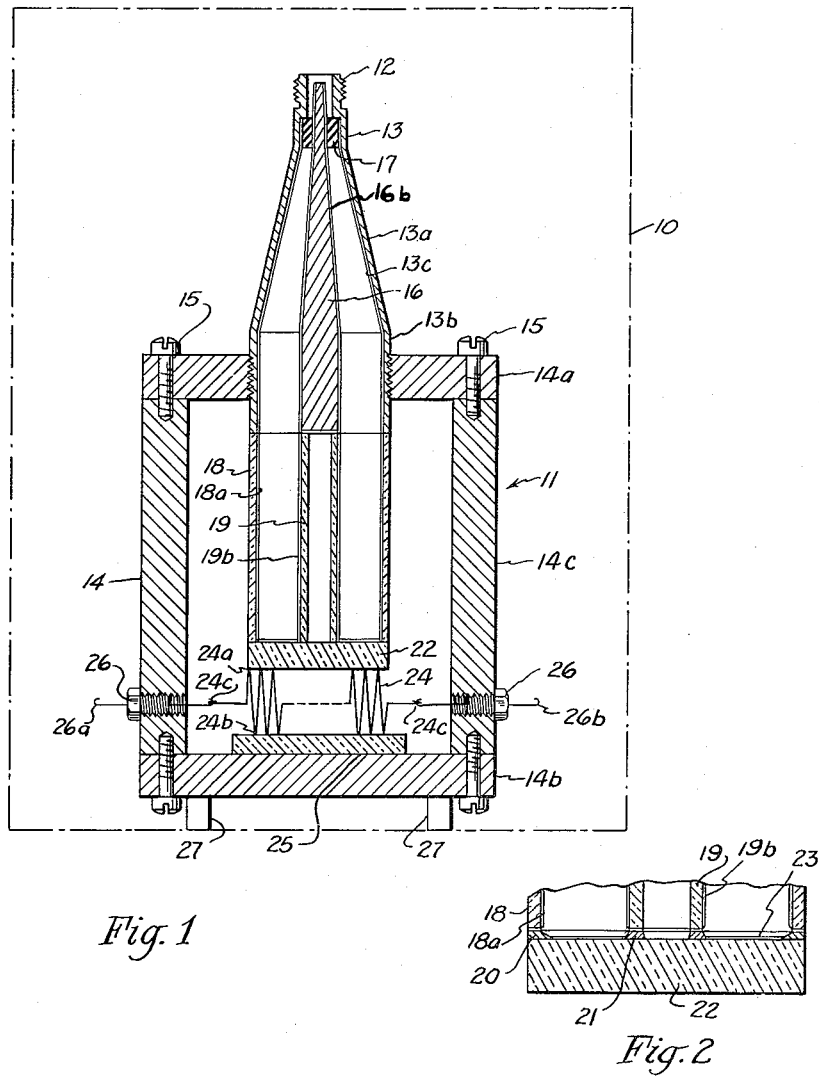
FIG. 1 shows a vertical sectional view of a preferred embodiment of the static calorimeter of this invention.
FIG. 2 illustrates an enlarged vertical sectional view of the lower portion of the calorimeter of FIG. 1.

Referring now to the drawings, wherein like reference characters designate like or corresponding parts throughout the several views, there is schematically shown in dotted line portions in FIG. 1 of the drawings a thermally insulated chamber 10 providing a constant temperature environment into which the dry, static calorimeter 11 of this invention is to be inserted.

The calorimetric power dissipating and measuring device illustrated in FIG. 1 is a designed for use in connection with coaxial lines. For supplying radio-frequency energy to the calorimeter 11 a conventional line connector 12 is provided. An outer hollow cylindrical conductor 13 having a constant impedance taper 13a is integral with the connector 12, said taper increases the line diameter to approximately 1½ inches and extends to slightly above the top surface of a cylindrical casing 14.

In a preferred embodiment of the invention the casing 14 is constructed of aluminum or the like. The top, bottom and side members 14a–14c, respectively, are one-half inch in thickness and are attached by screws 15 or the like to form a cylindrical casing 4 inches in diameter by 6 inches in length.

A vertical portion 13b of the conductor 13 screwably inserts into the top member 14a of the casing 14, said conductor 13 terminates slightly below the lower surface of member 14a. Conductor 13 is preferably made of brass, the inner surface 13c thereof is electrolytically plated with silver.

A central tapered conducting rod 16, preferably constructed of brass or the like, is plated with silver on its outer surface 16b. The rod 16 extends slightly below the lower surface of member 14a and terminates in the same horizontal plane with the conductor 13. A low-loss insulated bushing 17 supports the inner rod 16 in a conventional manner.

As illustrated in FIG. 1 of the drawings glass tubes 18—19 having outside diameters equal to those of conductor 13 and rod 16, respectively, and approximately 4 inches in length, are soldered at one end to the respective elements 13 and 16 to form axial extensions thereto. The inner surface 18a of the tube 18 and the outer surface 19b of the tube 19 are coated with a silver paint, such as Du Pont No. 4760, to a thickness of approximately 0.001". The section of silvered glass line provides a fair degree of thermal isolation for the load resistor hereinafter to be discussed in detail.

Referring now to FIG. 2 of the drawings, the lower ends of the glass tubes 18—19 are soldered in a conventional manner to truncated annular rings 20—21 of silver, which in turn attach to a glass disc substrate 22. A 50-ohm disc-type resistor 23 which constitutes the nonreflective load or heat source is made by evaporating a thin film of a low temperature coefficient alloy onto the disc substrate 22 between the rings 20—21. Contact to the film is made by means of fired silver electrodes. The thickness of the film is of the order of $10^{-6}$ cm. and its temperature coefficient of resistance is approximately 20 parts per million per degree centigrade. Hence, at frequencies up to approximately 500 mc., skin effect is negligible and at temperatures up to 100° C. the resistance changes by only 0.2%. The change in reflected power due to such a small change in resistance is negligible in comparison to other uncertainties in the system.

A measure of the temperature rise in the load resistor 23 produced by the dissipation of power in the load is obtained by means of a conventional copper-constantan thermopile 24 (see FIG. 1) consisting of a plurality of series-connected thermocouples. In a preferred embodiment of the invention, the number of junctions was limited to 50, the net effect of adding more thermocouples is to increase the sensitivity and also the thermal conductance. The hot junctions 24a are soldered to small electrically isolated areas on the bottom surface of substrate 22 whereas the cold junctions 24b are cemented to a ceramic disc 25 of large area. The hot and cold junctions 24a—24b are positioned approximately one inch apart. Disc 25 is preferably constructed of $Al_2O_3$ and is cemented to the bottom member 14b of the casing 14 as by Sauereisen Cement No. 29 or the like.

The thermopile leads 24c connect with and are brought through the casing by 1000 mmfd. feed-through capacitors 26, such as Aerovox type CF–1, which screwably insert into the lower side portions 14c of the casing.

Casing 14 is supported within the container 10 by a plurality of legs 27 which attach to the bottom member 14b in a conventional manner.

In the static calorimeter where high accuracy is desired, the temperature rise is usually measured at conditions of thermal steady state. Since a measurement of temperature rise only is desired, the steady state temperature $T_1$ may be measured with respect to some arbitrarily chosen reference temperature $T_0$.

In a preferred embodiment of the invention, chamber 10 contains a refrigeration coil (not shown) over which air is continually recirculated. The temperature within chamber 10 is 0° C. and is kept constant to within ±0.002° C. by means of a sensitive electronic circuit. The calorimeter 11 is thus kept at the temperature of the chamber 10, said temperature serves as the reference temperature $T_0$. In the absence of power input the equilibrium temperature of the entire calorimeter will, of course, be $T_0$ also.

The steady-state temperature $T_1$ is a function of power input as well as the degree of thermal isolation of the body from its surroundings. Temperature $T_1$ is independent of frequency therefore the calorimeter can conveniently be calibrated with D.C. power and subsequently used to measure power at any frequency. Thus the calorimeter is actually a transfer standard measuring RF power in terms of accurately known D.C. or low frequency power.

When power is fed into the input of the calorimeter at a fixed level, heat is generated in the load resistor at the same rate as the absorption of the electrical energy. The heat is first manifested in a temperature rise of the load resistor which has a certain thermal capacity. Subsequently, heat flows from the load to the surroundings by conduction, convection and radiation. After equilibrium has been attained, the thermal E.M.F. is measured across the terminals 26a—26b of capacitors 26 with a precision D.C. potentiometer. The thermal E.M.F. is then calibrated in terms of the applied power.

Figure 3:
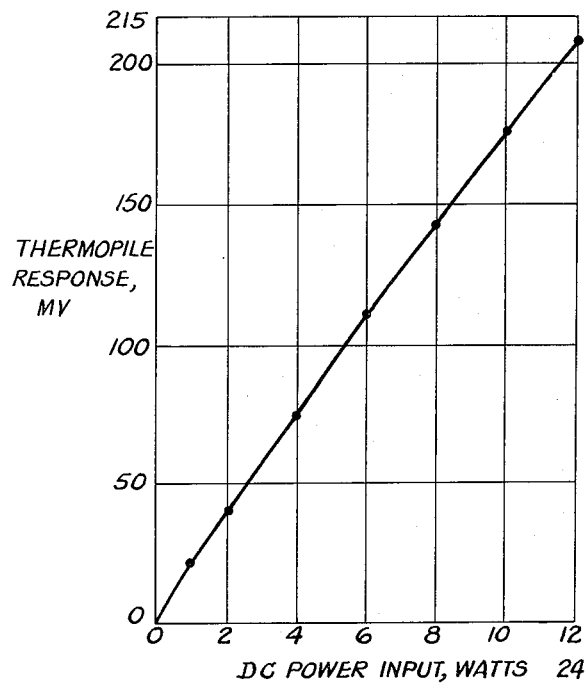
FIG. 3 is a graph illustrating the thermopile output plotted as a function of D.C. power input to the calorimeter.

The measured response of the thermopile, in millivolts, is plotted in FIG. 3 of the drawings as a function of the D.C. power input in watts. Experimental data shows that below 0.2 watt the curve is approximately linear while between 0.2 watt and 1 watt the curve is defined by the simple empirical equation $$e = K_1 P^{0.951} \tag{1}$$

where $e$ represents the open circuit thermopile output voltage, $K_1$ is a constant of proportionality and P is the D.C. power input in watts. Equation 1 plots as a straight line on log log paper.

Above 1 watt the equation of the curve of FIG. 3 is $$e = K_2 P^{0.927} \tag{2}$$

which produces another straight line as a log log plot.

Figure 4:
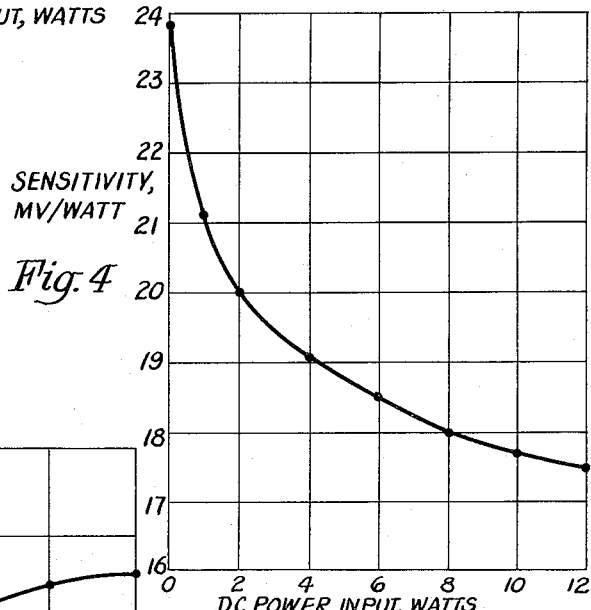
FIG. 4 is a graph illustrating thermopile sensitivity vs. power input level.
Figure 5:
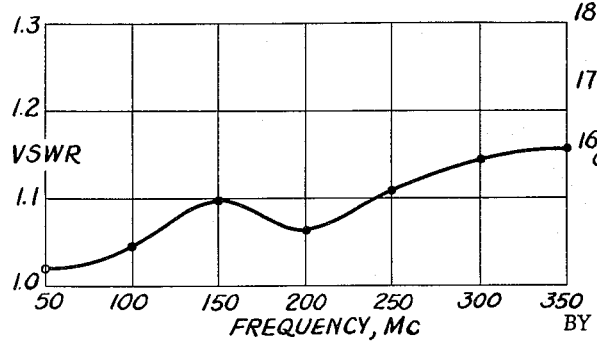
FIG. 5 is a graph of the voltage-standing-wave ratio (VSWR) of the calorimeter as a function of frequency.

The sensitivity of the improved calorimeter of this invention is 23.50 mv. per volt below 0.2 watt and as shown by the plots in FIG. 4 decreases at higher power levels due to convection and radiation losses. The equation of the curve in FIG. 4 of the drawings is $$S = S_0 P^{-0.08} \tag{3}$$

where S is the sensitivity of the calorimeter at any power level, $S_0$ is the initial sensitivity and P is power in watts. At 12 watts, for example, the value of S is approximately 17% below $S_0$.

Since the calorimeter is housed in a temperature controlled environment ordinary room temperature variations have no noticeable effect on the thermopile output. There is, however, a small residual output from the thermopile of ±5 microvolts with zero power input to the calorimeter. This residual E.M.F. is equivalent to ±0.2 mw. and causes this much uncertainty in the measurement at all power levels.

The time constant of the calorimeter, which is defined as the time necessary for the thermal E.M.F. to reach 63% of its final value, is approximately 4 minutes. To obtain maximum accuracy, however, a period of approximately 40 minutes must be allowed between measurements to permit the system to reach steady state conditions.

As aforementioned, this calorimetric wattmeter is not an absolute instrument but rather the response of the temperature-sensing device must be calibrated using known values of D.C. or low frequency power. For example, the calorimeter may be calibrated with D.C. power using a laboratory standard type voltmeter and ammeter. The accuracy of each of these instruments is 0.1%, hence the accuracy of the D.C. power was 0.2%.

At frequencies up to 300 mc. losses in the coaxial mount were estimated to be 0.0025 db or 0.05%. This estimate is based on the values given in tables for 1½ inch diameter rigid coaxial line with air dielectric. Thus, in using the calorimeter to measure RF power the uncertainty in the measurements amounts to $$\pm(0.5\% + 0.2 \text{ mw.})$$

this factor includes the substitution error, the D.C. calibration error as well as losses in the coaxial mount but does not include errors due to the VSWR being different from unity.

The calorimeter measures, of course, only the power it absorbs. Some energy is reflected at RF since the VSWR is not unity. Since the VSWR is known, a correction factor due to reflected power can be applied; as illustrated in the graph of FIG. 6, the VSWR varies with frequency.

Performance of the calorimeter was further evaluated by making comparison RF power measurements between it and other independent methods. These included a low-power thermistor bridge and a medium power bolometer bridge. In all cases agreement was equal to or better than the sum of the uncertainties of the instruments involved.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention.

What is claimed is:

1. In a static calorimetric wattmeter, a coaxial transmission line including a central conducting rod, a coaxial outer conductor and an input connector, said outer conductor having a constant impedance taper, a casing consisting of top, bottom and side members, said outer conductor connecting with said top casing member, a disc substrate having first and second surfaces, means connecting the outer conductor and the central conducting rod to the first surface of said disc substrate, a load resistance film on said first surface of the substrate to thereby bridge the coaxial conductors and terminate said coaxial line, a plurality of thermocouples having hot and cold junctions, a ceramic disc on said bottom casing member, the hot junctions of said thermocouples attached to said second surface of the disc substrate and the cold junctions attached to said ceramic disc.

2. In a static calorimetric wattmeter, a coaxial line including a central conducting rod, a coaxial outer conductor and an input connector, said outer conductor having a constant impedance taper, a thick-walled casing consisting of top, bottom and side members, means connecting said outer conductor with said top casing member, a disc substrate having first and second surfaces, means connecting said outer conductor and said central conducting rod to said first surface of the disc substrate, a resistive film comprising a non-reflective load on said first surface of the disc substrate to thereby bridge the coaxial conductors and terminate the coaxial line, a plurality of series connected thermocouples having hot and cold junctions, said hot junctions of said thermocouples attached to said second surface of the disc substrate, a ceramic disc positioned on said bottom casing member, said cold junctions of said thermocouples attached to said ceramic disc.

3. In a static calorimetric wattmeter, a coaxial transmission line including a central conducting rod, a coaxial outer conductor and an input connector, said outer conductor having a constant impedance taper, a thick-walled casing consisting of top, bottom and side members, said outer conductor connecting with said top casing member, a disc substrate having first and second surfaces, means axially extending said outer conductor and central conducting rod, said axial extensions attached to said first disc substrate surface, a resistive film comprising a non-reflective load on said first substrate surface to thereby bridge the conductors and terminate the coaxial line, a plurality of series connected thermocouples having hot and cold junctions, a ceramic disc attached to said bottom casing member, said hot junctions of said thermocouples attached to said second disc substrate surface and said cold junctions attached to said ceramic disc.

References Cited in the file of this patent

UNITED STATES PATENTS 2,848,683   Jones _____ Aug. 19, 1958